(12) United States Patent
Bonvin et al.

(10) Patent No.: US 8,704,479 B2
(45) Date of Patent: Apr. 22, 2014

(54) SYSTEM AND METHOD FOR DETERMINING THE START POSITION OF A MOTOR

(75) Inventors: Frederic Bonvin, Longmont, CO (US); Davide Betta, Barzano (IT); Agostino Mirabelli, Lomello (IT); Andrea Di Ruzza, Roccasecca (IT)

(73) Assignees: STMicroelectronics, Inc., Coppell, TX (US); STMicroelectronics S.r.l., Agrate Brianza (IT)

( * ) Notice: Subject to any disclaimer, the term of this patent is extended or adjusted under 35 U.S.C. 154(b) by 618 days.

(21) Appl. No.: 12/941,366

(22) Filed: Nov. 8, 2010

(65) Prior Publication Data

US 2011/0109255 A1    May 12, 2011

Related U.S. Application Data

(60) Provisional application No. 61/260,372, filed on Nov. 11, 2009.

(51) Int. Cl.
*H02P 6/00*    (2006.01)

(52) U.S. Cl.
USPC .............. 318/721; 318/400.04; 318/400.14; 318/400.32; 318/400.33; 318/400.01; 388/809; 388/821

(58) Field of Classification Search
USPC ............ 318/400.01, 400.07, 400.14, 400.1, 318/400.31, 400.32, 400.04, 400.06, 721, 318/400.33, 432, 799, 801; 388/809, 821
See application file for complete search history.

(56) References Cited

U.S. PATENT DOCUMENTS

| | | | | |
|---|---|---|---|---|
| 5,245,256 | A | * | 9/1993 | Cassat et al. ............. 318/400.35 |
| 5,254,914 | A | * | 10/1993 | Dunfield et al. ......... 318/400.34 |
| 6,064,191 | A | * | 5/2000 | Turner ......................... 324/127 |
| 6,448,725 | B1 | * | 9/2002 | Cho et al. ................. 318/400.04 |
| 6,989,668 | B2 | * | 1/2006 | Mayes ....................... 318/254.1 |
| 8,368,331 | B2 | * | 2/2013 | Brattoli et al. ........... 318/400.04 |
| 2004/0036436 | A1 | * | 2/2004 | Tieu .............................. 318/439 |

OTHER PUBLICATIONS

Elaine Rhodes, ASIC Basics:An Introduction to Developing Application Specific Integrated Circuits, 2005, Elaine Rhodes, pp. 3-4 and 8.*

* cited by examiner

*Primary Examiner* — Antony M Paul
(74) *Attorney, Agent, or Firm* — Graybeal Jackson LLP (57) ABSTRACT

A system and method for determining the start position of a motor. According to an embodiment, a voltage pulse signal may be generated across a pair of windings in a motor. A current response signal will be generated and based upon the position of the motor, the response signal will be greater in one pulse signal polarity as opposed to an opposite pulse signal polarity. The response signal may be compared for s specific duration of time or until a specific integration threshold has been reached. Further, the response signal may be converted into a digital signal such that a sigma-delta circuit may smooth out glitches more easily. In this manner, the position of the motor may be determined to within 60 electrical degrees during a startup.

29 Claims, 4 Drawing Sheets

SYSTEM AND METHOD FOR DETERMINING THE START POSITION OF A MOTOR

PRIORITY CLAIM

This patent application claims priority to U.S. Provisional Patent Application No. 61/260,372 entitled 'DETERMINING THE START POSITION OF A MOTOR' filed on Nov. 11, 2009 and is hereby incorporated by reference.

BACKGROUND

Three-phase brushless direct-current (DC) motors have many uses, among which include both high-speed and low-speed applications. Conventional high-speed applications include spindle motors for computer hard disk drives, digital video disk (DVD) drives, compact-disk (CD) players, tape-drives for video recorders, and blowers for vacuum cleaners. A motor for high-speed applications typically operates in a range from a few thousand revolutions per minute (RPM's) to 20,000 RPM's, for example. Conventional low-speed applications include motors for farm and construction equipment, heating, ventilation, and air-conditioning (HVAC) compressors, and fuel pumps. Motors for low-speed applications typically operate in a range from less than a few hundred RPM's to a few thousand RPM's, for example. Compared to DC motors employing brushes, brushless DC motors enjoy reduced noise generation and improved reliability because no brushes need to be replaced due to wear.

A brushless DC motor includes a permanent magnet rotor and a stator having a number of windings, typically three and often referred to as phases A, B, and C. The windings are each formed in a plurality of slots in the stator. Often, the rotor may be housed within the stator, but in some applications, the stator may also be housed within the rotor. The rotor is permanently magnetized, and turns to align its own magnetic flux with the flux generated by the windings when current flows through the windings. As such, when power is supplied to the windings (as current through the windings), the rotor will be pushed or pulled in a specific direction due the magnetic flux created by the current.

Power to the motor is often provided in a pulse width modulation (PWM) mode. The PWM mode is a nonlinear mode of power supply in which the power is switched on and off at a very high frequency in comparison to the angular velocity of the rotor. In order to operate the motor, the flux existing in the stator is controlled to be as quadratic as possible with the rotor flux, thereby continually pulling the rotor forward. Therefore, to optimize the efficiency of the motor, it is advantageous to monitor the position of the rotor so that the flux in the stator may be appropriately controlled and switched from one commutation stage to the next in the commutation sequence. If the rotor movement and the flux rotation should ever get out of synchronization, the rotor may become less efficient, start to jitter, or stop turning.

When first starting up, coils of the brushless DC motor are energized in a proper sequence such that the magnetic flux generated will initiate or continue to drive the rotor in the proper direction. Therefore, the rest or low speed position of the rotor relative to the stator is determined before starting up the motor so as to initiate the proper drive signal. Conventional methods for determining the beginning position of the rotor relative to the stator may be inefficient and time-consuming approaches. One general technique for detecting the starting position of the motor at standstill or at low speed is to use external sensors, such as hall sensors or optical sensors, which can provide the rotor position information. However, this technique requires external sensors, extra circuitry to process the sensor signals, and increases the parts count and the size of the circuit board. Such cumbersome solutions are inefficient and wasteful of time and energy.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Prior to a more detailed description of various solutions and embodiments discussed below, a broad overview of one embodiment of the subject matter disclosed herein is presented. As discussed briefly above, the position of motor windings during low-speed and startup operations is useful for efficiently and quickly driving a motor up to operational speeds. Thus, when first starting the motor, a series of voltage pulses may be initiated on specific pairs of windings in a specific order. That is, with three windings or phases A, B, and C, voltage pulses may be sent through different pairs, such as A-B, B-C, and C-A and different times. Further, the voltage pulses may be initiated at each pair of phases at a reverse polarity as well. Based upon the transient response of a current signal generated in each pair of windings immediately after each voltage pulse, one can determine the position of the rotor with respect to each individual pair of windings; e.g., either the rotor is between 0 and 180 degrees in lead of the winding pair or between 0 and 180 degrees behind winding pair. As this may be repeated for each of the other two pairs of windings, one can determine to within 60 degrees where the rotor is currently at rest.

In the past, conventional solutions would measure the transient response in an analog manner and with respect to the transient signal reaching a specific analog threshold. In this manner, the amount of time necessary to reach the threshold in one polarity could be compared to the amount of time necessary to reach the threshold in the opposite threshold. Such a comparison effectively determines the inductance of the pair of windings for each polarity and one can determine that the faster time corresponds to the smaller inductance. As these analog solutions were pressed for faster and faster processing speeds with smaller and smaller magnitudes of initial pulses, noise from external sources affects the measurements as glitches in the signal could be interpreted as the threshold being reached ahead of time. Thus, simple measurement of magnitude in an analog domain may be too time-consuming and cumbersome given the power and time-constraints required for today's brushless DC motor application.

According to embodiments discussed herein, a motor controller using a better startup technique will measure the transient current response in each pair of windings when pulsed in a different manner. In one embodiment, the analog transient response signal may be integrated such that an accumulated signal may be measured until a specific threshold is reached. By integrating the signal, glitches may be countenanced because the magnitude of the glitch is only for a short duration of time. Such glitches do not add a great amount to the accumulated integrated signal. In another embodiment, the transient current response may be converted into a digital signal through an analog-to-digital converter. Then the digital signal may be accumulated as well until a threshold is reached or alternatively each polarity for a fixed length of time and then initiate a comparison of the accumulated value to determine the higher inductance. Further yet, in other embodiments, the integration circuit may employ a sigma-delta circuit that allows for weighting the changes to the magnitude of the instant digital values, thereby reducing the influence of any sudden changes (due to noise for example. Each of these embodiments is discussed below with respect to FIGS. 4-8 after a discussion of the overall brushless DC motor and motor controller in FIGS. 1-3.

Figure 1:
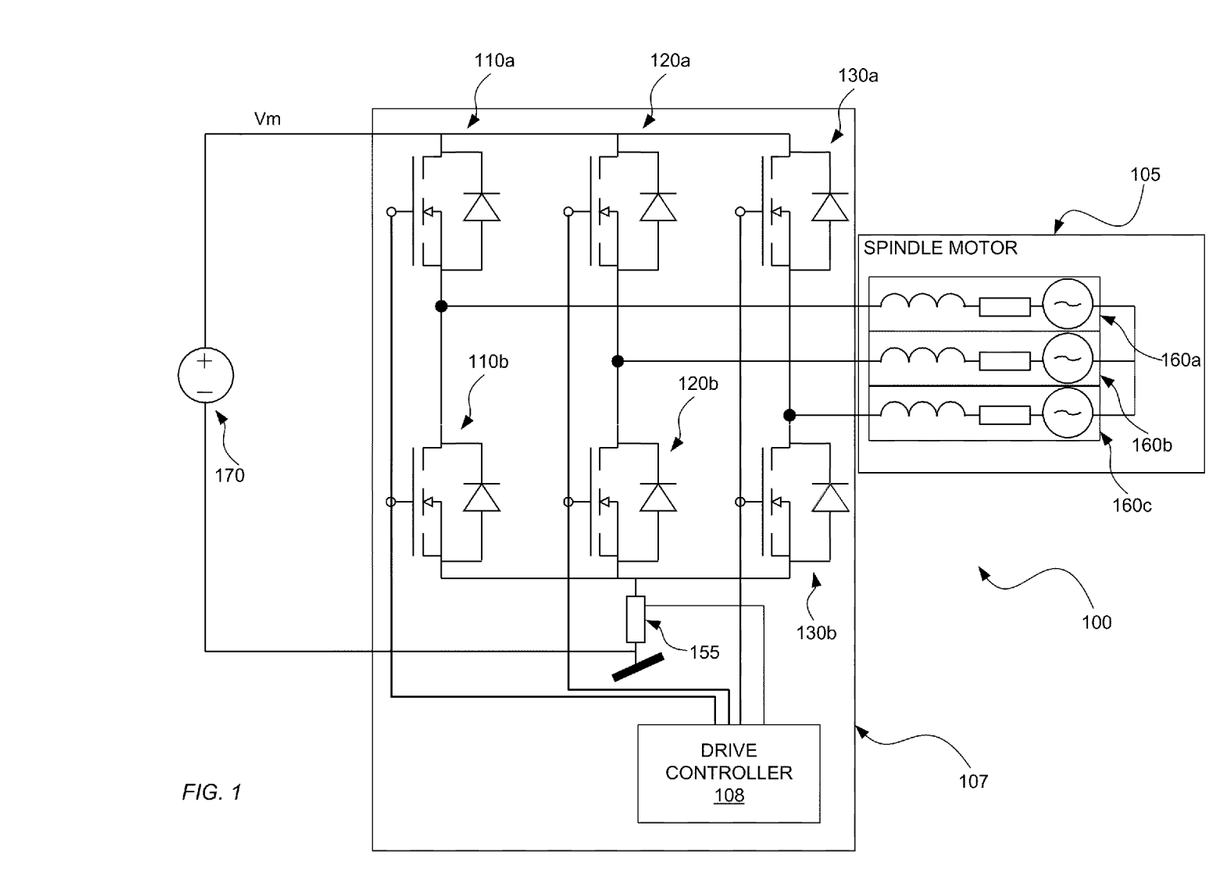
FIG. 1 is a block diagram of an embodiment of a brushless DC motor with a motor controller.

FIG. 1 is a schematic diagram of an embodiment of a drive system 100 for driving a brushless DC motor 105. The motor 105 may be a brushless three-phase direct-current (DC) motor that may be driven synchronously by a controller 108, which may be part of a power chipset 107. Thus, instead of a mechanical commutation system based on brushes typically found in a brushed DC motor, the brushless DC motor 105 is commutated using electronic circuitry. Such circuitry may include MOSFET transistors 110a/b, 120a/b, and 130a/b, which are part of the power chipset 107. The power chip set 107 may be an integrated circuit disposed on a single die, or may be multiple integrated circuits and/or non-integrated circuit components disposed on separate dies or otherwise separately from each other. Because the commutation occurs electronically, it is helpful to know the location of the rotors prior to startup and during operation so that the MOSFET transistors 110a/b, 120a/b, and 130a/b may be optimally controlled.

These MOSFET transistors compose three sets of bi-directional drivers 110a/b, 20a/b and 130a/b (these MOSFET transistor pairs may also be called half bridges) that drive the phases 160a-c of the motor 105. Each MOSFET transistor 110a/b, 120a/b and 130a/b may be turned on and off at each transistor's respective gate by drive signals. These drive signals may be controlled by a drive controller 108. The drive controller 108 may control the MOSFET transistors 110a/b, 120a/b and 130a/b by monitoring a current through sense circuit 155 to produce a desired phase voltage, and, therefore, a corresponding motor speed. More advanced controllers 108 may employ a microprocessor to manage the motor's acceleration/deceleration, control the motor speed, and fine-tune efficiency of delivery of power to actuating the motor.

In operation, a power supply 170 provides a voltage to a voltage bus Vm. This voltage may be, for example, 12V for hard disk-drive (HDD) systems in desktop computers and may be 5V for HDD systems in laptop computers. Although described as a HDD system 100 herein, the methods and applications discussed herein are applicable to any device having a motor for actuating a spinning device. For example, a DVD drive, a CD drive and other similar devices may also employ the methods and techniques discussed herein. Prior to operation, and as discussed above, the position of the rotors with respect to the stator may be determined in order to conserve time and energy when first starting the motor 105. Various embodiments of various techniques of such a startup sequence are described in the following paragraphs.

One general technique to determine the starting position of the motor 105 at standstill or low speed is a sensorless technique where the stator coils are energized and the coil inductance is determined. Thus, a voltage pulse may be initiated through each phase's coil by energizing each MOSFET pair. Based upon the measured decay of the voltage pulse, one can decipher where each phase's coil is with respect to a magnetic pole. From the coil inductance, a circuit may determine the position of the rotor relative to the stator with enough accuracy to crudely determine a proper start-up sequence, e.g., which phase to drive first, second and third, etc. This is able to be determined because in a brushless DC motor 105, the rotor has poles formed from the aforementioned permanent magnets.

Thus, in one embodiment of this technique, one provides a voltage pulse from Vm across the serial combination of two coils (for example coils associated with Phase A 160a and Phase B 160b) to generate a transient current response through these two coils. This current is measured through sense circuit 155 to determine the inductance of the coils. The pair of coils is energized with both voltage polarities (e.g., a first polarity by turning on MOSFET 110a with 120b and then a second polarity by turning on MOSFETs 110b with 120a) to cause a current to flow through the coils in both directions, and then values related to these two transient current responses are compared, and a measure of the coil inductance is determined from the polarity of the difference between the positive and negative coil currents. From this measure of the coil inductance, the position of the rotor is determined within an accuracy of 180 electrical degrees. That is, one may determine within which half of the electrical cycle the position of the rotor coincides because the inductance on one side will be greater than the other. Furthermore, these voltage and current pulses have time durations that are small enough so that they do not cause the rotor to rotate any significant distance.

Next, a different pair of coils (for example, phases B 160b and C 160c) is energized in the same iterative way to narrow the rotor position down to within 120 electrical degrees, again based upon measured inductance. Finally, the last pair of coils (for example, phases C 160c and A 160a) is energized in the same iterative way to narrow the rotor position down to within 60 electrical degrees This level of accuracy is sufficient to start the motor 105 rotating in the proper direction, but may be susceptible to noise and other electrical artifacts.

Figure 2:
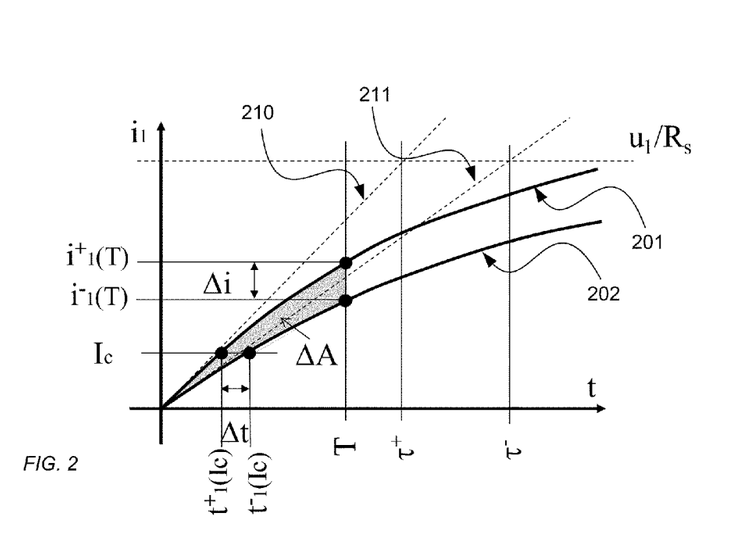
FIG. 2 is a plot of current values in a pair of coils that may be used in various methods for determining the start position of a motor according to an embodiment of the subject matter disclosed herein

With any pair of transient current responses, one can measure a number of parameters to determine the inductance for each polarity signal. With reference to FIG. 2, one may plot a first transient current response 201 from a voltage pulse from a signal having a first polarity and a second transient current response 202 from a voltage pulse from a signal having the opposite polarity (inverted for comparison sake). In one method, one can measure the magnitude of each response signal 201 and 202 at a specific time T and then determine the difference Δi between the two magnitudes. In another method, one can measure each transient current response 201 and 202 until each one reaches a specific current threshold Ic. Based upon the difference in time it takes for each signal to reach this threshold, the polarity of the difference Δt may determine the relative inductance. Additional techniques not discussed in greater detail may measure the slope 210 and 211 of the current through the coil pair along a line that extends through the origin of a plot of the coil current versus time. While theoretically this may be a good technique, it may not be a good technique in practice as noise may create a significant error because the current is relatively small at and near the plot origin.

As briefly mentioned above, noise may affect the measurements of these response signals. Such noise may be caused, for example, by a switching regulator (not shown) that is cycling on and off in a discontinuous (lower-power) mode of operation, thereby causing glitches. If one of these glitches occurs when the method is about to transition to indicate that the current response has reached a threshold, then this glitch may cause a significant error in the determination of the time T by adding noise to the measured current signal that shifts the time T back or ahead a few microseconds from the transition time's true position when the current actually reaches the threshold value.

As noise may be a detrimental factor in simply measuring any instant magnitude, a better solution is to integrate the signals 201 and 202 to reduce the influence of glitches and noise. By integrating the signals, one can reduce the magnitude of the voltage pulses as well as the relative times and thresholds used in measuring the response signals. This is advantageous because lower voltage and current magnitudes are a more efficient use of power and shorter times for measurement provide for faster startup sequences for motors. Further, reducing the startup-position computation time inherently reduces the length T of the voltage pulse applied to the coils, and the magnitude of the coil current threshold that is reached in the shorter time T. Reducing the pulse time T actually may provide additional time savings, because not only is T shortened, but the time it takes for the current in the coils to decay back to zero is also shortened, so one can move on more quickly to either the next coil pair or to the reverse current of the present coil pair.

Figure 3:
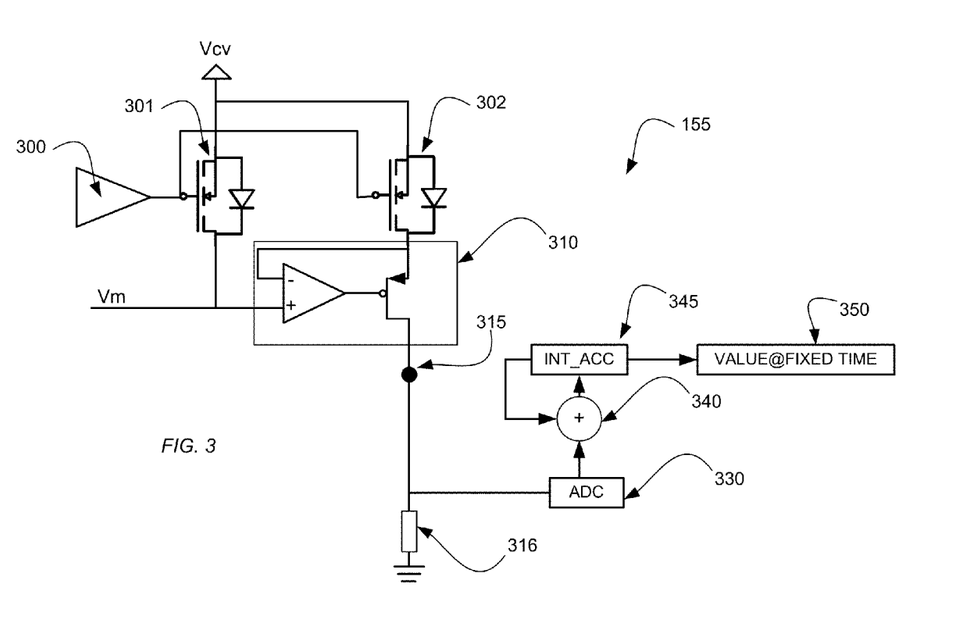
FIG. 3 is schematic diagram of a sense circuit for determining the position of a rotor by using a digital integrated fixed time method according to an embodiment of the subject matter disclosed herein.

Turning attention to FIG. 3, a sense circuit 155 may be used to determine the parameters of received transient current response signals during the startup methods discussed further below. FIG. 3 is schematic diagram of a sense circuit 155 for determining the position of a rotor by using a digital integrated fixed time method according to an embodiment of the subject matter disclosed herein. Prior to discussing various embodiments in FIGS. 3-8, a signal condition portion of the sense circuit 155 for receiving and manipulating the response signals 201 and 202 is discussed.

In a startup method, appropriate transistors (FIG. 1) are activated to apply a pulse of the voltage Vm across a serially coupled pair of the stator coils. The coil current flows through a transistor referred to as an isofet 301. The coil current flowing through 301 causes a current proportional to the coil current to flow through another transistor referred to as a sensefet 302. The sensefet 302 and other electronic components 310 constitute a current mirror, which generates a proportional output current (the constant of proportionality, which is one embodiment is K=1000, is related to the ratio of the current-mirror transistor widths) through an impedance 316 to convert the this output current into a sense voltage 315 that is proportional to the current through the coils.

The sense voltage 315 may be used in a number of different embodiments in a number of different ways to determine rotor position. The remaining components of FIG. 3 are used in a digital integrated fixed time method for determining start position. Thus, in this method, the voltage pulse on Vm will be applied for a fixed duration of time for each direction (e.g., polarity) for each pair of coils. The sense voltage 315 is converted to a digital signal at an analog-to-digital converter (ADC) 330. The digital signal is integrated at integrator 335 and the accumulated signal over time is held in an integrator accumulator 340. After the fixed amount of time, a measurement of the accumulator yields a specific value 350 that represents the integrated current signal in the coils due to the voltage pulse over the fixed time (e.g., the area under the curve of a first response signal 201 of FIG. 2). This measurement is repeated for the other current direction representing the area under the second response signal 202 of FIG. 2. Then, the difference between the two values is determined, and the polarity of this difference indicates the 180 degree portion of the motor's electrical period in which the rotor position lies. Thus, after repeating this for the other two pairs of coils, one can determine the position of the rotor to within 60 degrees.

Figure 4:
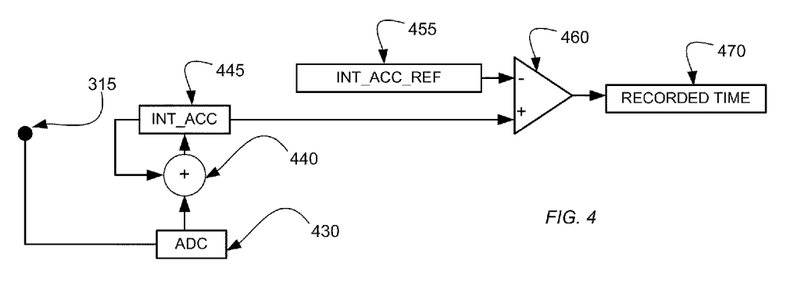
FIG. 4 is schematic diagram of a portion of the sense circuit for determining the position of a rotor by using a digital integrated threshold method according to an embodiment of the subject matter disclosed herein.

FIG. 4 is schematic diagram of a portion of the sense circuit 155 for determining the position of a rotor by using a digital integrated threshold method according to an embodiment of the subject matter disclosed herein. In this embodiment, the sense voltage 315 (which remains the same sense voltage 315 as previously described with respect to FIG. 3) may be used to determine an integrated signal corresponding to the current generated in the coils as a result of the voltage pulse on Vm.

The sense voltage 315 is converted to a digital signal at an analog-to-digital converter (ADC) 430. The digital signal is then integrated at integrator 435 and the accumulated signal over time is held in an integrator accumulator 440. At specific sample times, a measurement of the accumulator yields a specific value that represents the integrated current signal in the coils due to the voltage pulse over the sample time (e.g., the area under the curve of a first response signal 201 of FIG. 2). This measurement may be compared at comparator 460 to an integrator accumulator reference value 455 at each sample time. If the integrator accumulator value 440 exceeds the integrator accumulator reference value 455 (i.e., exceeds the reference threshold), then the actual time is recorded and stored for comparison to a recorded time for the opposite polarity pulse.

Thus, sampling and iterative measurement is repeated for the other current direction representing the area under the second response signal 202 of FIG. 2. When each recorded time is stored, the difference between the two values is determined, and the polarity of this difference indicates the 180 degree portion of the motor's electrical period in which the rotor position lies. Thus, after repeating this for the other two pairs of coils, one can determine the position of the rotor to within 60 degrees.

The previous two embodiments employed a digital conversion of an analog sense voltage to provide a simpler integration of the represented current in the specific coils. With such topography in place, one may utilize a sigma-delta circuit to further limit the effect of spurious signals that are not representative of the targeted coil current for measure. With the sigma-delta circuit, one can use a fixed time method (FIG. 5, described below) or a threshold method (FIG. 6, described below) similar to that which has been described above with respect to FIGS. 3 and 4.

Figure 5:
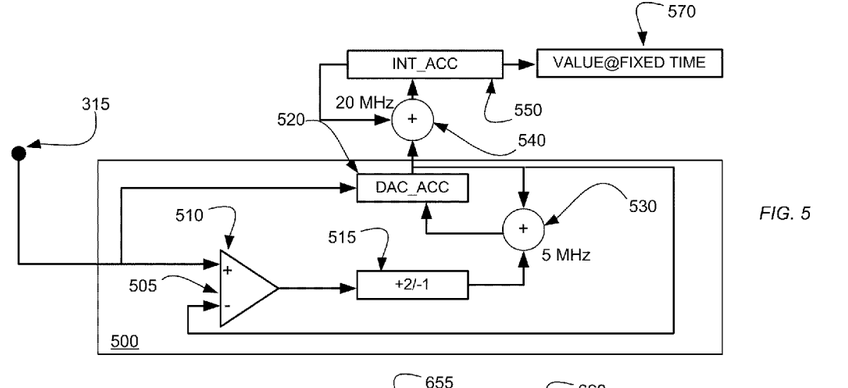
FIG. 5 is schematic diagram of a sense circuit for determining the position of a rotor by using a digital integrated sigma-delta fixed time method according to an embodiment of the subject matter disclosed herein.

FIG. 5 is schematic diagram of a sense circuit for determining the position of a rotor by using a digital integrated sigma-delta fixed time method according to an embodiment of the subject matter disclosed herein. As before the sense voltage signal 315 is used to measure the represented current in the coil when pulsed by Vm. However, instead of feeding this sense voltage directly to an ADC, the sense voltage is fed to a sigma-delta circuit 500 such that a digital signal is generated that is representative of the initial voltage signal, but with specific weighted values that depend upon the change in the sense voltage signal per sample time.

The sense voltage 315 is input to the positive input 506 of a comparator 510. The negative input 505 of the comparator 510 receives feedback signal from the culmination of the sigma-delta circuit, a digital signal accumulation signal 520. As the transient current response increases from zero (e.g., the sense voltage signal 315 increases from zero), the output of the comparator 510 is positive, and this causes an incrementor circuit 515 to output an increment value, which in this embodiment is +2. Then, at the next clock edge (5 MHz in this embodiment), an adder adds the +2 to the digital signal accumulation signal 520 that also is initially zero. The digital signal accumulation signal 520 is fed back to the comparator 510 to effectively update the comparison value for the comparator 510.

If the digital signal accumulation signal 520 is greater than the sense voltage 315 (this may occur if there are noise glitches on the sense voltage) then the comparator 510 output is negative. Therefore, on the next clock cycle, a value (−1 in this embodiment), is added to digital signal accumulation signal 520 to again try to cause the digital signal accumulation signal 520 to track the sense voltage 315, and thus the coil current. Generally, because the coil current will always increase when a voltage pulse on Vm is present, the increment/decrement ratio may be weighted more towards a current increase (e.g., +2 vs. −1) even though noise may, on occasion, cause what seems to be a temporary decrease in the coil current.

As before, digital signal accumulation signal 520 is also provided to an integration circuit at every integrator clock cycle (20 MHz in this embodiment) such that the accumulation of the digital signal accumulation signal 520 is tracked. Note the clocks used to trigger for the two summers may have different frequencies as in this embodiment, or may have the same frequency in other embodiments. For example, the frequency of the first clock (e.g., 5 MHz) may be dictated by the bandwidth of the sigma-delta loop, but the frequency of the second clock (e.g., 20 MHz) may be higher to provide the integrator with higher resolution. Furthermore, although shown as having a +2/−1 increment/decrement ratio, other ratios may be used for weighting glitches and other anomalies differently. Further yet, the start time of the integrator circuit may be delayed for a set duration of time (e.g., until the coil current reaches approximately 300 mA or another value) after the beginning of the coil pulse, to e.g., eliminate start-up noise.

Thus, the end result of feeding the sense voltage signal 315 to the sigma-delta circuit 500 is a digital signal accumulation signal 520. The digital signal accumulation signal 520 is then integrated through integrator 540 to provide an integrator accumulation value 550 that, as before, represents the area under the current vs. time curve 201 of FIG. 2 as weighted by the sigma-delta circuit 500. Then, at a specific fixed time, the total accumulated signal is determined and stored for later comparison to the opposite polarity signal. This method is repeated for the other current direction (e.g., opposite polarity signal) to determine an integrator accumulation value 550 for the opposite polarity signal. As before, the difference between the two values is determined, and the polarity of this difference indicates the 180 degree portion of the motor's electrical period in which the rotor position lies. Repeating this procedure for each of the other pairs of coils again results in a determination of the rotor position to within 60 degrees.

Figure 6:
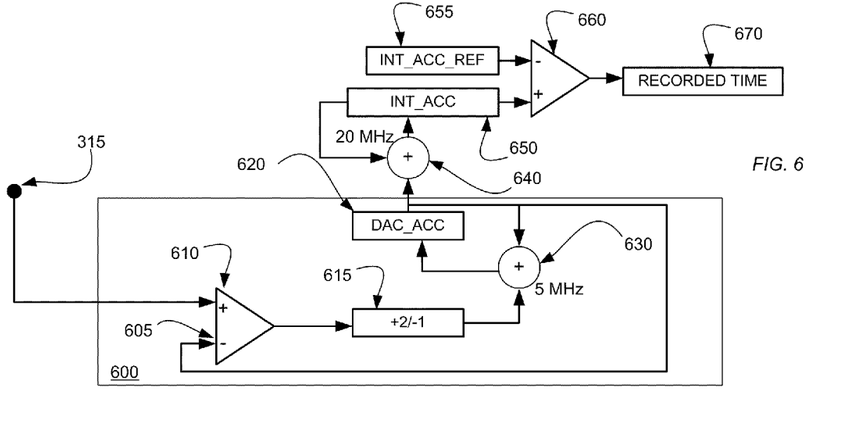
FIG. 6 is schematic diagram of a portion of the sense circuit for determining the position of a rotor by using a digital integrated sigma-delta threshold method according to an embodiment of the subject matter disclosed herein.

FIG. 6 is schematic diagram of a portion of the sense circuit for determining the position of a rotor by using a digital integrated sigma-delta threshold method according to an embodiment of the subject matter disclosed herein. Once again, the sense voltage signal 315 is used to measure the represented current in the coil when pulsed by Vm. The sense voltage 315 is fed to a sigma-delta circuit 600 such that a digital signal is generated that is representative of the initial voltage signal, but with specific weighted values that depend upon the change in the sense voltage signal per sample time.

As the transient current response increases from zero, the output of the comparator 610 is positive, and this causes an incrementor circuit 615 to output an increment value. Then, at the next clock edge, an adder 630 adds the +2 to the digital signal accumulation signal 620 that also is initially zero. The digital signal accumulation signal 620 is fed back to the comparator 610 to effectively update the comparison value for the comparator 610. Similarly, if the digital signal accumulation signal 620 is greater than the sense voltage 315, then the comparator 610 output is negative and a decrement is implemented.

As before, digital signal accumulation signal 620 is also provided to an integration circuit to be integrated through integrator 640 to provide an integrator accumulation value 650 that, as before, represents the area under the current vs. time curve 201 of FIG. 2 as weighted by the sigma-delta circuit 600. Then, at each sample time, the total accumulated signal 650 is compared (at comparator 660) to an integrator accumulator reference value 655. Once the integrator accumulation value 650 exceeds the reference threshold, the total time elapsed is determined and stored for comparison to the second opposite polarity iteration. As before, the difference between the two time values is determined, and the polarity of this difference indicates the 180 degree portion of the motor's electrical period in which the rotor position lies. Repeating this procedure for each of the other pairs of coils again results in a determination of the rotor position to within 60 degrees.

Figure 7:
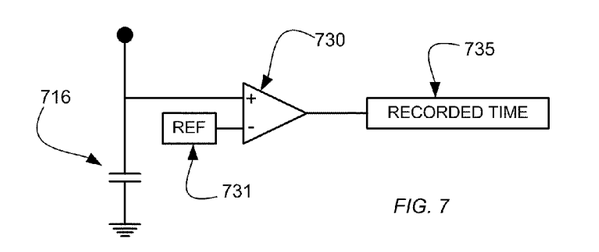
FIG. 7 is schematic diagram of a portion of the sense circuit for determining the position of a rotor by using an analog integrated threshold method according to an embodiment of the subject matter disclosed herein.

FIG. 7 is schematic diagram of a portion of the sense circuit for determining the position of a rotor by using an analog integrated threshold method according to an embodiment of the subject matter disclosed herein. In this embodiment, the initial signal is not proportionally converted to a voltage signal as described in FIG. 3 with the impedance 316. Rather, the analog current signal (which may still be scaled down as described above) is integrated with a capacitor 716 and then fed to a comparator 730 and measured against a reference value 731 (e.g., a threshold). One can then determine a recorded time 735 as to when the coil current reaches or exceeds a predetermined threshold. Then, the recorded times from the positive and negative currents are compared, and the rotor position is determined from the polarity of the difference between the two times. In this sense, the integration of the current signal acts as a low pass filter to filter out noise from the coil-current signal.

Figure 8:
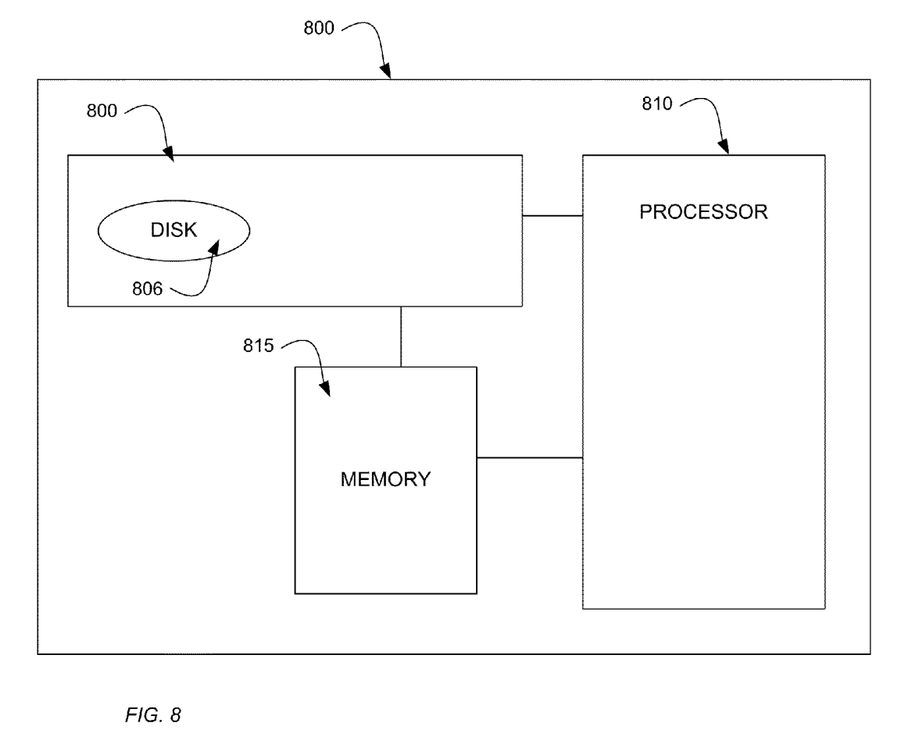
FIG. 8 is a block diagram of an embodiment of a computer system 800 that may implement the drive system 100 of FIG. 1.

FIG. 8 is a block diagram of an embodiment of a computer system 800 that may implement the drive system 100 of FIG. 1. In this system embodiment, the system 800 may include a processor 810 coupled to a local memory 815 and coupled to the drive system 100. As can be seen, the drive system 100 includes a hard disk 806. The processor 810 may be operable to control the memory 815 and the drive system 100 in transferring data to and from the disk 806 and to and from the memory 815. Further, additional data stores and communication channels (not shown) may be used to transfer data to and from the drive system 100 that may be remote from this computer system 800.

Such a computer system may be any number of devices including a CD player, a DVD player, a Blu-Ray player, a personal computer, a server computer, a smart phone, a wireless personal device, a personal audio player, media storage and delivery system or any other system that may read and write data to and from a storage medium or communication channel.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A controller for a motor, comprising:
a signal generation circuit configured to generate a pulse signal at a phase winding of the motor, the pulse signal generating a current in the phase winding;
a sense circuit coupled to the phase winding of the motor configured to generate a sense voltage proportional to the current generated in the phase winding;
a digital integrator configured to generate an integrated current signal in response to the current generated in the phase winding and in response to the sense voltage; and
a detection circuit configured to determine the position of a rotor of the motor in response to the integrated current, wherein determining the position of the rotor of the motor comprises measurement of the polarity of the time difference between currents generated in the phase winding.

2. The controller of claim 1 wherein the motor comprises windings for three phases such that three pairs of windings comprise two of the three windings and wherein the signal generation circuit is further configured to generate six pulses for each pair of phase windings in different polarities.

3. The controller of claim 2 wherein integrator is further configured to integrate a signal corresponding to current generated in each pair of phase windings for each polarity.

4. The controller of claim 2 wherein the detection circuit is further configured to determine the polarity of a difference between a first integrated current signals associated with a first pair of windings and a first polarity and a second integrated current signals associated with the first pair of windings and a second polarity.

5. The controller of claim 1 wherein the integrator comprises an analog integrator configured to integrate the generated current in the phase windings until a threshold is reached.

6. The controller of claim 1, further comprising an analog-to-digital converter configured to generate a digital signal proportional to the current generated in the phase winding.

7. The controller of claim 6 wherein the integrator comprises a digital integrator configured to integrate the generated current in the phase windings until a threshold is reached.

8. The controller of claim 6 wherein the integrator comprises a digital integrator configured to integrate the generated current in the phase windings for a fixed duration of time.

9. A controller for a motor, comprising:
a signal generation circuit configured to generate a pulse signal at a phase winding of the motor, the pulse signal generating a current in the phase winding;
an integrator configured to generate an integrated current signal in response to the current generated in the phase winding;
a detection circuit configured to determine the position of a rotor of the motor in response to the integrated current;
an analog-to-digital converter configured to generate a digital signal proportional to the current generated in the phase winding; and
a sigma-delta circuit configured to compare the generated current in the phase windings to a feedback signal based upon the integrated generated current in the phase windings and to generate incremental influence on the integrated current signal based upon the comparison.

10. The controller of claim 9 wherein the incremental influence for a comparison resulting in the generated current in the phase windings being greater than the feedback signal is a positive influence and the incremental influence for a comparison resulting in the generated current in the phase windings being less than the feedback signal is a negative influence.

11. The controller of claim 10 wherein the positive influence comprises twice the magnitude of the negative influence.

12. The controller of claim 9 wherein the sigma-delta circuit operates at a frequency that is less than the frequency of the operation of the integrator.

13. The controller of claim 9 wherein the sigma-delta circuit operates at a frequency of approximately 5 MHz and the integrator operates at a frequency of approximately 20 Mhz.

14. The controller of claim 9 wherein the integrator comprises a digital integrator configured to integrate the generated current in the phase windings until a threshold is reached.

15. The controller of claim 9 wherein the integrator comprises a digital integrator configured to integrate the generated current in the phase windings for a fixed duration of time.

16. A controller for a motor, comprising:
a signal generation circuit configured to generate a pulse signal at a phase winding of the motor, the pulse signal generating a current in the phase winding;
an integrator configured to generate an integrated current signal in response to the current generated in the phase winding;
a detection circuit configured to determine the position of a rotor of the motor in response to the integrated current;
an analog-to-digital converter configured to generate a digital signal proportional to the current generated in the phase winding; and
a signal conditioning circuit configured generate a sense voltage signal that is proportional to the current generated in the phase winding, the sense voltage scaled by a scaling factor and provided to an input of the integrator.

17. A device, comprising:
a motor having three phases of windings configured in a wye configuration; and
a motor controller, including:
- a signal generation circuit configured to generate a pulse signal at each phase winding of the motor, the pulse signal generating a current in one of the phase windings;
- a sense circuit coupled to each phase winding of the motor configured to generate a sense voltage proportional to the current generated in the one of the phase windings;
- an analog-to-digital converter configured to generate a digital signal in response to the current generated in the phase winding and in response to the sense voltage;
- an integrator configured to generate an integrated current signal in response to the digital signal; and
- a detection circuit configured to determine the position of a rotor of the motor in response to the integrated current, wherein determining the position of the rotor of the motor comprises measurement of the polarity of the time difference between currents generated in the one of the phase windings.

18. The device of claim 17 wherein the motor comprises a three-phase brushless direct-current motor.

19. The device of claim 17 wherein the motor controller is disposed on a single integrated circuit die.

20. The device of claim 17 wherein the motor controller is disposed on multiple integrated circuit dies.

21. The device of claim 17 further comprising:
a processor coupled to the motor controller through a bus; and
a memory coupled to the processor and coupled to the motor controller through the bus.

22. A method, comprising:
generating a first signal in a winding of a motor;
measuring a response signal in the winding, the response signal generated in response to the first signal;
generating a sense voltage signal in response to the response signal;
digitally integrating the sense voltage signal; and
determining the position of the rotor of the motor in relation to a the winding of the motor based upon a measurement of the polarity of the time difference between currents generated in the winding.

23. The method of claim 22, further comprising converting the response signal from an analog into a digital signal through an analog-to-digital converter.

24. The method of claim 22 wherein the measurement of the response signal comprises integrating the response signal over a specific duration of time.

25. The method of claim 22 wherein the measurement of the response signal comprises integrating the response signal until a specific threshold is reached and recording the duration of time required to reach the threshold.

26. The method of claim 22, further comprising:
generating the first signal in a first pair of windings in a motor according to a first polarity; and
generating a second signal in the first pair of windings in a motor according to a second polarity.

27. The method of claim 26, further comprising:
measuring a second response signal in the winding, the second response signal generated in response to the second signal; and
determining the position of the windings of the motor in relation to a stator of the motor based upon a comparison of measurements of the first and second response signals.

28. The method of claim 22 wherein the first signal comprises a voltage pulse and the response signal comprises a current signal.

29. The method of claim 22, further comprising incrementally influencing the measurement based upon an assigned weighted value corresponding a level of change in the measurement as compared to a previous level of change of the measurement.

* * * * *